(12) United States Patent
Jurcak et al.

(10) Patent No.: US 6,890,190 B1
(45) Date of Patent: May 10, 2005

(54) STEEL FUEL FLANGE WITH PLASTIC STRUT MOUNTS AND GROUNDED STRUTS

(75) Inventors: Michael J. Jurcak, Columbus, MI (US); Paul F. Briggs, Grand Blanc, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 75 days.

(21) Appl. No.: 10/403,424

(22) Filed: Mar. 31, 2003

Related U.S. Application Data
(60) Provisional application No. 60/450,280, filed on Feb. 27, 2003.

(51) Int. Cl.[7] .............................................. H01R 13/648
(52) U.S. Cl. ........................................ 439/92; 439/939
(58) Field of Search ............................ 439/92, 95, 939

(56) References Cited

U.S. PATENT DOCUMENTS

| | | | |
|---|---|---|---|
| 2,273,214 A | 2/1942 | McConaghy | |
| 4,569,637 A | 2/1986 | Tuckey | 417/360 |
| 5,056,492 A | 10/1991 | Banse | 123/509 |
| 5,080,077 A | 1/1992 | Sawert et al. | 123/514 |
| 5,482,444 A | 1/1996 | Coha et al. | 417/363 |
| 5,540,192 A | 7/1996 | Xanders | 123/41.44 |
| 5,697,797 A | * 12/1997 | Wendel | 439/92 |
| 5,762,049 A | 6/1998 | Jones et al. | 123/514 |
| 6,036,453 A | 3/2000 | Zepp et al. | 417/410.4 |
| 6,062,203 A | 5/2000 | Takahashi et al. | 123/509 |
| 6,302,747 B1 | 10/2001 | Bui et al. | 439/736 |
| 6,336,794 B1 | 1/2002 | Kim | 417/363 |
| 6,367,650 B1 | 4/2002 | Kuehneumund et al. | 220/651 |
| 6,488,877 B1 | 12/2002 | Amburgey et al. | 264/209 |
| 6,499,453 B1 | 12/2002 | Immel et al. | 123/90.31 |

FOREIGN PATENT DOCUMENTS

GB 22222437 A 3/1990

OTHER PUBLICATIONS

U.S. patent application Publication –Pub. No. US2002/0061253 A1, Poissant, May 23, 2002 "Pump Unit for Viscous Liquids".
U.S. patent application Publication –Pub. No. US2002/0163263 A1, Uffelman, Nov. 7, 2002, "RFI Shield Structure for an Electric Motor in a Fuel Pump Housing".
U.S. patent application Publication –Pub. No. US2003/0002997 A1, Hazama, Jan. 2, 2003, "Fuel Supply Apparatus".
U.S. patent application Publication –Pub. No. US2003/0000502 A1, Jones et al., Jan. 2, 2003, "In–Tank Fuel Supply Unit".
PCT International Search Report (Application No. PCT/US2004/006105) –Mailing Date Jul. 20, 2004.

* cited by examiner

*Primary Examiner*—Tho D. Ta

(57) ABSTRACT

A flange assembly of a fuel supply unit includes a metal flange 14 having a bottom surface. A metal tab bracket 20 is provided having a base 22 and at least one tab 24. The tab bracket is coupled to the bottom surface of the flange 14. At least one metal strut 12 is provided. A plastic strut holder 30 holds an end of the metal strut. The plastic strut holder is secured to the flange by engagement with the tab, with the end of the strut contacting the base of the tab bracket, thereby securing the plastic strut holder and the metal strut with respect to the flange, while providing a conductive path between the flange and the strut.

10 Claims, 5 Drawing Sheets

STEEL FUEL FLANGE WITH PLASTIC STRUT MOUNTS AND GROUNDED STRUTS

This application is based on U.S. Provisional Application No. 60/450,280, filed on Feb. 27, 2003, and claims the benefit thereof for priority purposes.

FIELD OF THE INVENTION

The invention relates to fuel supply units for automobile vehicles and more particularly, to a plastic strut mount for connecting metal struts to a flange of the fuel supply unit while maintaining a conductive grounding path between the struts and flange.

BACKGROUND OF THE INVENTION

A typical fuel supply unit for a vehicle includes a steel fuel flange configured to be sealed to a wall of a fuel tank. The flange is interconnected with a fuel pump assembly by a pair of metal struts. As shown in FIG. 1, typically, metal mounts, cups or brackets 10 are used to secure the struts 12 in place with respect to a bottom of the flange 14. In addition, to ground the metal struts 12 with respect to the flange 14, a separate metal bracket 16 is employed, providing a conductive path between the metal strut 12 and the steel flange.

The struts 12 are typically secured to the brackets 16, and/or mounts 10 using a welding process that increases costs of assembly. In addition, the flange supplier must deal with the struts extending from the flange, which increases the complexity of shipping the flange, and increases the number of parts at the flange supplier. Furthermore, the reliability of the strut-flange connections needs to be improved.

Accordingly, there is a need provide a plastic strut mount structure for a fuel supply unit, while maintaining a ground connection between the struts and a flange.

SUMMARY OF THE INVENTION

An object of the invention is to fulfill the need referred to above. In accordance with the principles of the present invention, this objective is obtained by providing a method of coupling a metal strut to a metal flange of a fuel supply unit. The method provides a metal flange and a metal tab bracket having a base and at least one tab extending from the base. The tab bracket is secured to a bottom surface of the flange. A plastic strut holder is provided that has a boss including an opening there through. An end of the strut is inserted through the opening so as to be held by the plastic strut holder. The plastic strut holder is placed over the metal tab bracket so that the end of the strut contacts the base of the metal tab bracket, thereby defining a conductive path between the flange and the strut. The tab is bent so to contact a portion of the plastic strut holder thereby securing the strut holder and strut held thereby with respect to the tab bracket and thus, to the flange.

In accordance with another aspect of the invention, a flange assembly of a fuel supply unit includes a metal flange having a bottom surface. A metal tab bracket is provided having a base and at least one tab. The tab bracket is coupled to the bottom surface of the flange. At least one metal strut is provided. A plastic strut holder holds an end of the at least one metal strut. The plastic strut holder is secured to the flange by engagement with the tab, with the end of the strut contacting the base of the tab bracket, thereby securing the plastic strut holder and the metal strut with respect to the flange, while providing a conductive path between the flange and the strut.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
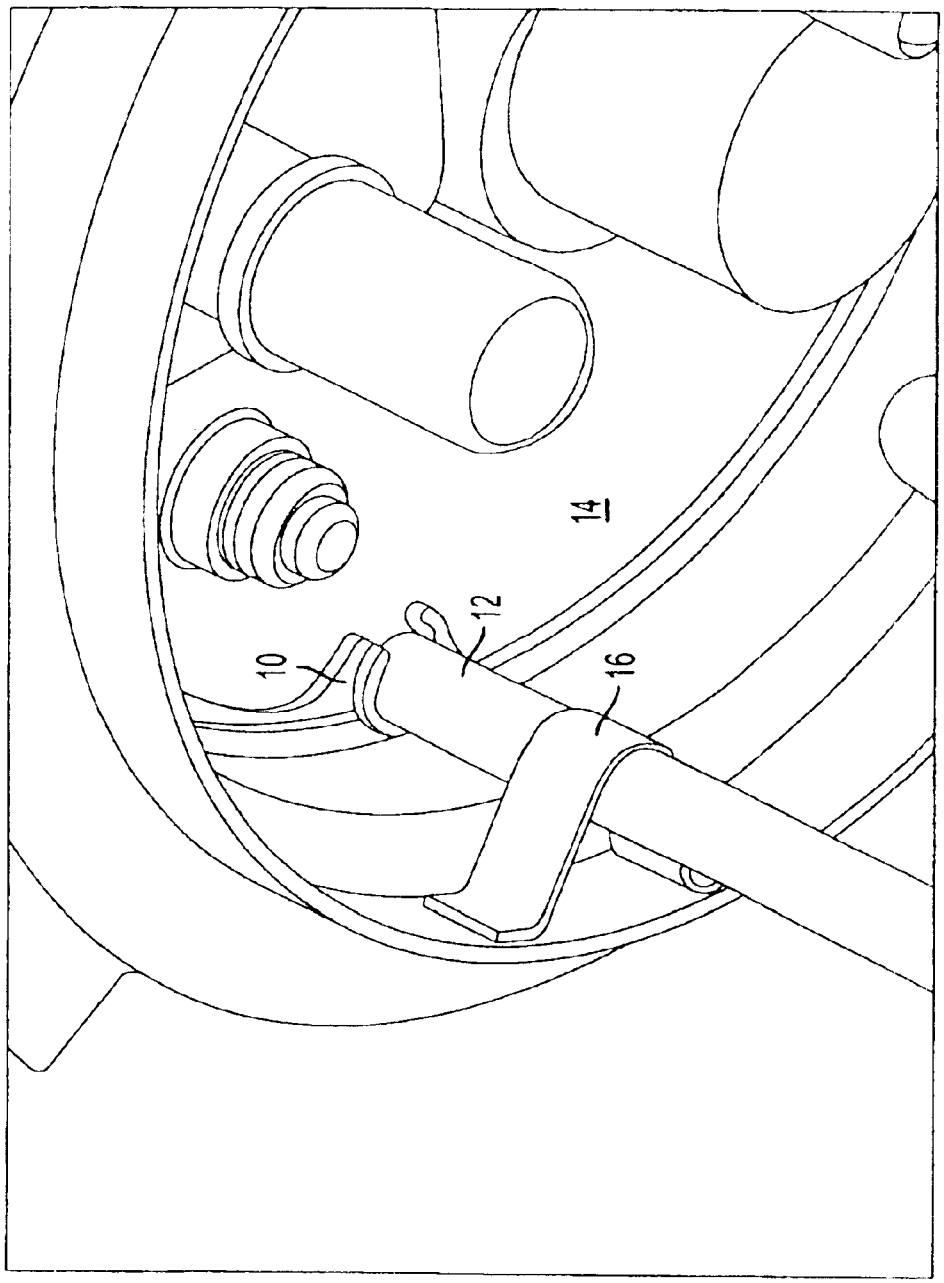
FIG. 1 is an enlarged view of a conventional connection of a metal strut to an underside of a steel flange of a fuel supply unit.
Figure 2:
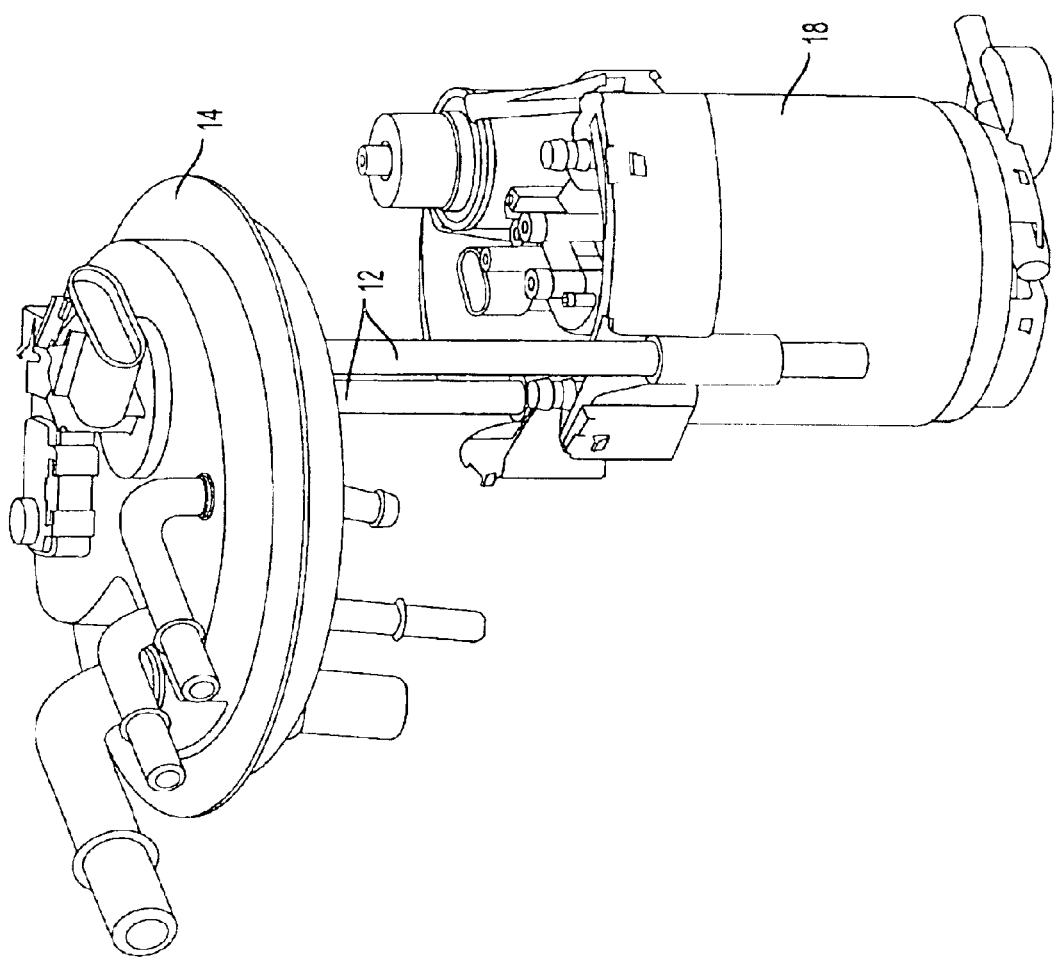
FIG. 2 is a perspective view of a fuel supply unit showing a flange connected with a fuel pump via struts in accordance with the principles of the present invention.

With reference to FIG. 2, a steel or metal flange 14 is interconnected with a fuel pump assembly 18 by a pair of metal struts 12, in accordance with the principles of the present invention. An embodiment of a connection of a strut 12 with the bottom or underside of the flange 14 is shown in the exploded view of FIG. 3. A single metal grounding tab bracket, generally indicated at 20, is secured, by welding or the like, to the bottom of the flange 14. The tab bracket 20 is associated with securing a strut 12 with respect to the flange 14. Thus, two tab brackets 20 are provided on the bottom of the flange 14, but only one is shown.

Each tab bracket 20 has a base 22, secured to the flange 14, and at least one tab 24. In the embodiment, a tab 24 extends generally upwardly from each end of the base 22. The base 22 also includes a mounting boss 26 having an opening 28 sized to receive an end of the strut 12, as will be explained more fully below.

Figure 3:
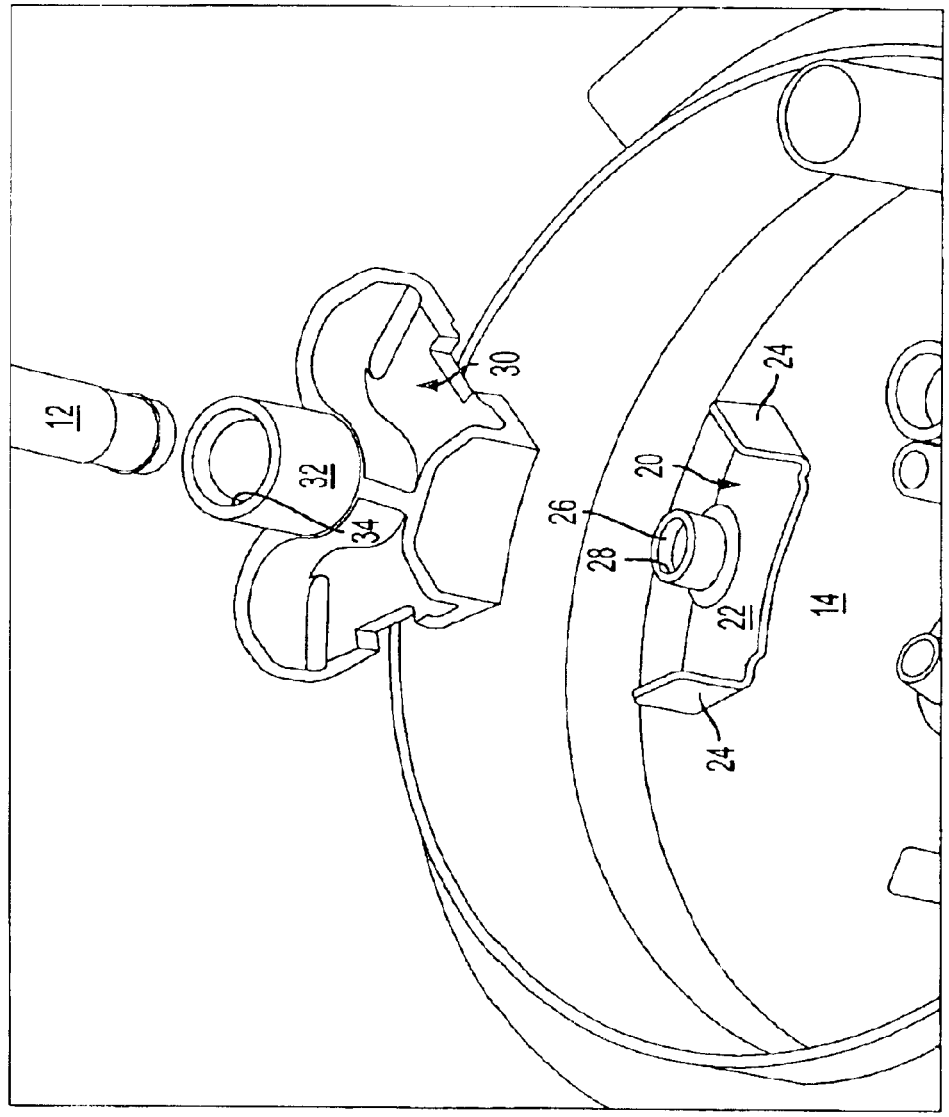
FIG. 3 is an enlarged perspective view of a bottom of the flange of FIG. 2, showing a plastic strut holder being located with respect to the grounding tab bracket in accordance with the invention.
Figure 5:
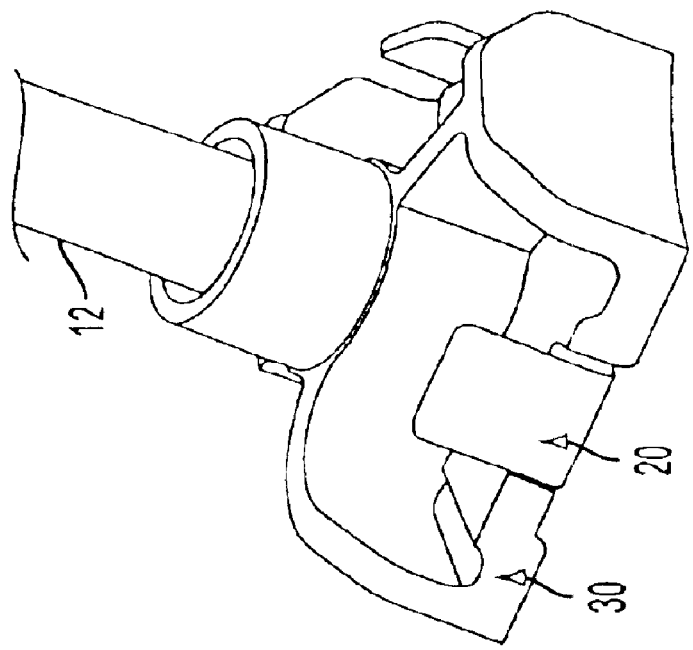
FIGS. 4 and 5 are enlarged perspective views of a structure coupled to a plastic strut holder via the grounding tab bracket.
Figure 4:
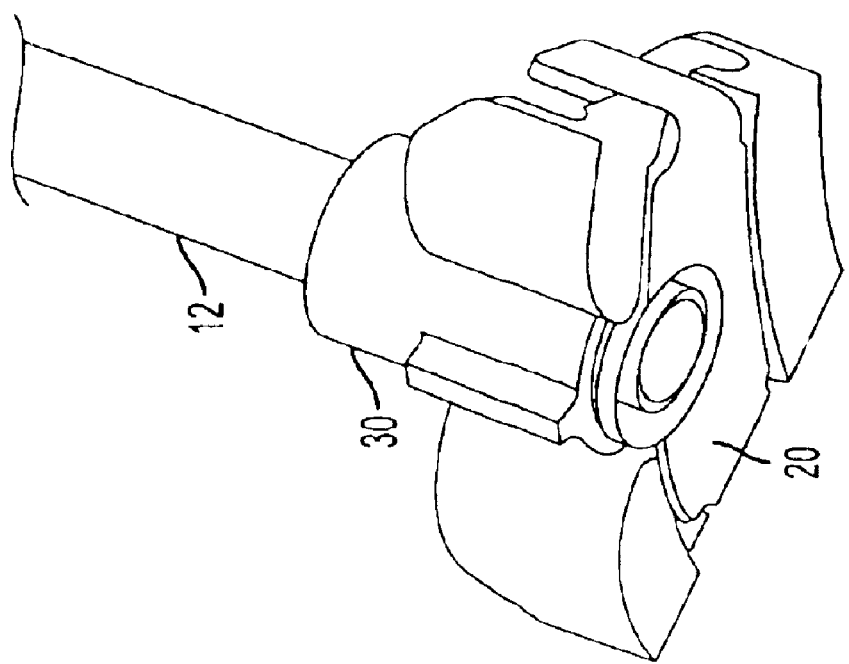

A plastic strut holder, in accordance with an embodiment of the invention, is shown generally indicated at 30 in FIGS. 3–5. One strut holder 30 is provided for each strut 12. The strut holder 30 has a boss 32 having an opening 34 therethrough for receiving and holding an end of the metal strut 12. Opening 34 is aligned with opening 28 so that the end of the metal strut 12 can be received in opening 28 of mounting boss 26 in a press-fit arrangement. Thus, the strut 12 can be force or press-fit with both the plastic strut holder 30 and the metal tab bracket 20.

Figure 6:
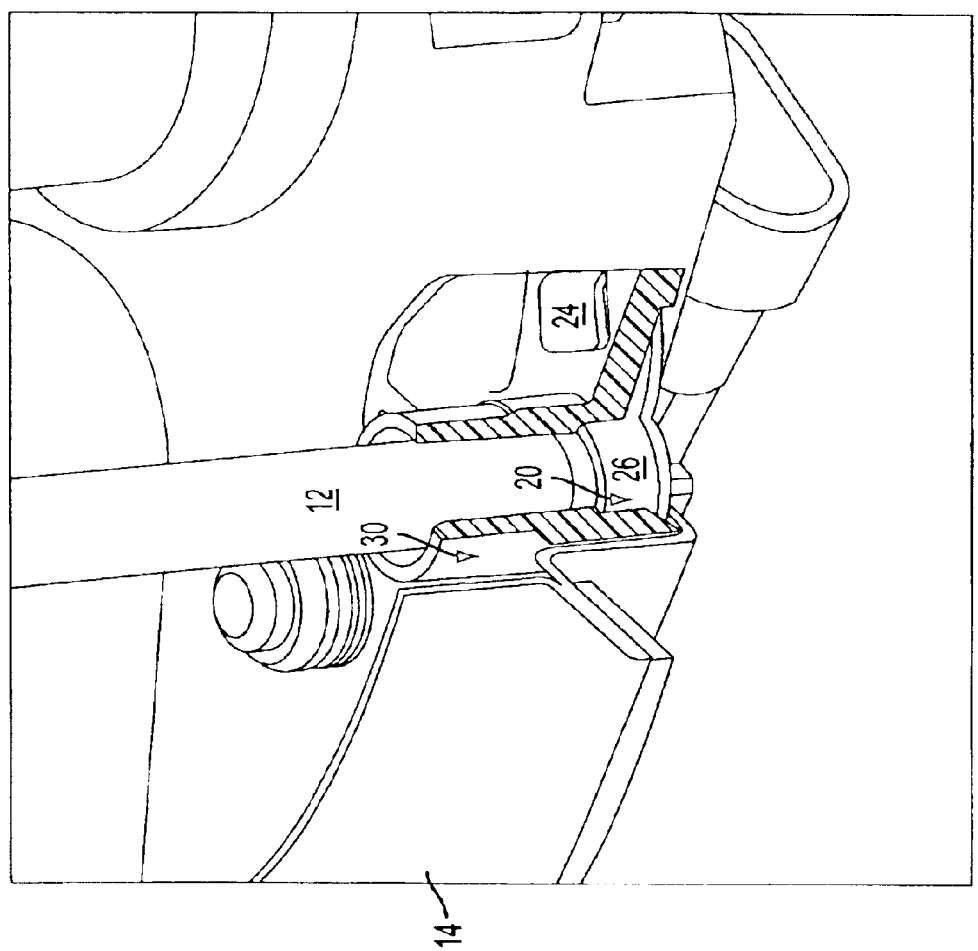
FIG. 6 is an enlarged perspective view, with portions cut-away for clarity of illustration, of a bottom of the flange of FIG. 3, showing a strut coupled thereto via the plastic strut holder and grounding tab bracket.

As shown in FIG. 6, the tabs 24 of the tab bracket 20 are bent to secure the strut holder 30 to the flange 14. Since the metal tab bracket 20 contacts the steel flange 14 and the metal strut 12 is in contact with the tab bracket 20, a conductive path is created from the strut 12 to the flange 14, even though a plastic strut holder 30 is employed.

It can be appreciated that instead of bending the tabs to engage the strut holder 30, the tabs could remain upright and include barbs. The strut holder 30 could include cooperating tab-receiving members having channel for receiving the tabs, with the barbs engaging surfaces defining the channels that receive the tabs.

Advantages of using the plastic strut holders of the invention are:

Reliability: The steel struts 14 hold better in plastic than in steel.

Cost: There is less welding and manufacturing time with the plastic strut holder from the flange supplier. The flange supplier does not have to deal with the long struts attached to the flange, since the struts can be attached later. This will improve quality from the flange supplier: ease of shipment, lower part numbers if only difference in application is strut length, more accurate location of the struts for further assembly in-house. Furthermore, grounding of the strut to the flange is achieved.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of coupling a metal strut to a metal flange of a fuel supply unit, the method including:

providing a metal flange, providing a metal tab bracket at a bottom of the flange, the tab bracket having at least one tab and surfaces defining a strut-receiving opening, providing a plastic strut holder having a boss including an opening therethrough, aligning the plastic strut holder with respect to the tab bracket so that the opening of the plastic strut holder aligns with the strut-receiving opening of the tab bracket, inserting an end of the strut into the openings so as to be held by the strut holder and be in contact with the surfaces defining the strut-receiving opening of the tab bracket, thereby defining a conductive path between the flange and the strut, and engaging the tab with the plastic strut holder thereby securing the strut holder and strut held thereby with respect to the tab bracket and thus, to the flange.

2. The method of claim 1, wherein the tab bracket is welded to the bottom of the flange.

3. The method of claim 1, wherein the engaging step includes bending the tab so as to contact a surface of the strut holder.

4. A method of coupling a metal strut to a metal flange of a fuel supply unit, the method including:

providing a metal flange, providing a metal tab bracket at a bottom of the flange, the tab bracket having a base and at least one tab extending from the base, providing a plastic strut holder having a boss including an opening therethrough, inserting an end of the strut through the opening so as to be held by the plastic strut holder, placing the plastic strut holder over the metal tab bracket so that the end of the strut contacts the base of the metal tab bracket, thereby defining a conductive path between the flange and the strut, and bending the tab so to contact a portion of the plastic strut holder thereby securing the strut holder and strut held thereby with respect to the tab bracket and thus, to the flange.

5. The method of claim 4, wherein the tab bracket is welded to the bottom of the flange.

6. A flange assembly of a fuel supply unit comprising:

a metal flange having a bottom surface, a metal tab bracket having a base and at least one tab, the tab bracket being coupled to the bottom surface of the flange, at least one metal strut, and a plastic strut holder holding an end of the at least one metal strut, the plastic strut holder being secured to the flange by engagement with the tab, with the end of the strut contacting the base of the tab bracket, thereby securing the plastic strut holder and the metal strut with respect to the flange, while providing a conductive path between the flange and the strut.

7. The flange assembly of claim 6, wherein the plastic strut holder includes a boss having an opening, the opening receiving an end of the metal strut in a press-fit arrangement.

8. The flange assembly of claim 6, wherein the base of the tab bracket includes a boss having an opening, the end of the strut being received in the opening and contacting surfaces defining the opening.

9. The flange assembly of claim 6, wherein the tabs are bent, engaging a surface of the strut holder.

10. The flange assembly of claim 9, wherein the tab bracket includes two tabs that are bent to engage the strut holder.

* * * * *